June 20, 1933.  G. NAISMITH ET AL  1,914,955
FURNACE
Filed Dec. 23, 1929  9 Sheets-Sheet 2

— Gas
⇉ Air
⇊ Products of Combustion

INVENTORS
George Naismith
Donald M. Naismith
by O. M. Clark
Atty.

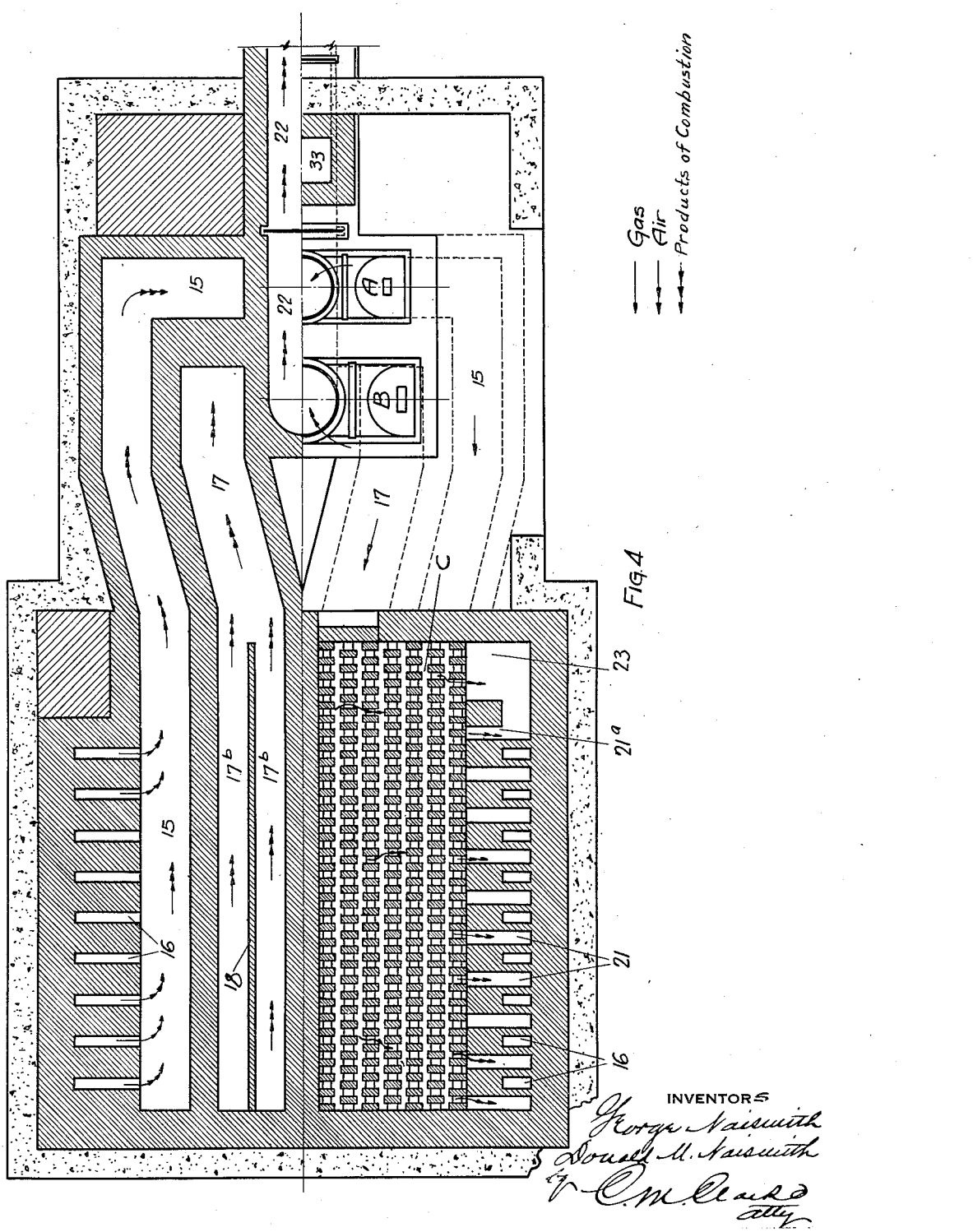

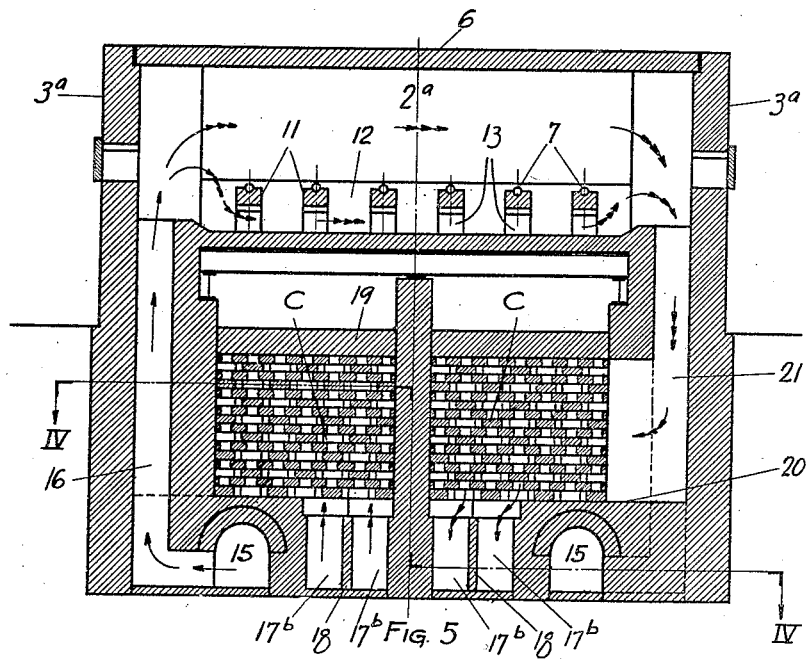
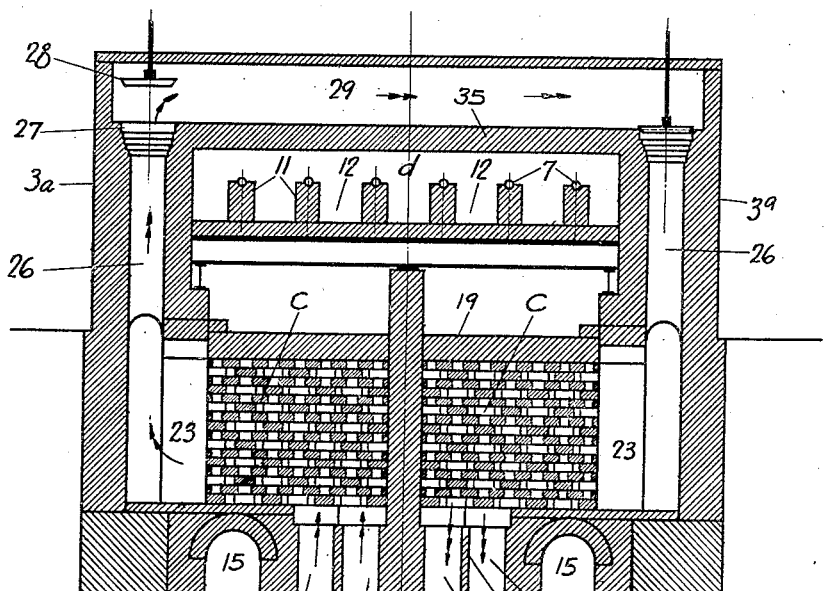

June 20, 1933.  G. NAISMITH ET AL  1,914,955
FURNACE
Filed Dec. 23, 1929  9 Sheets-Sheet 7
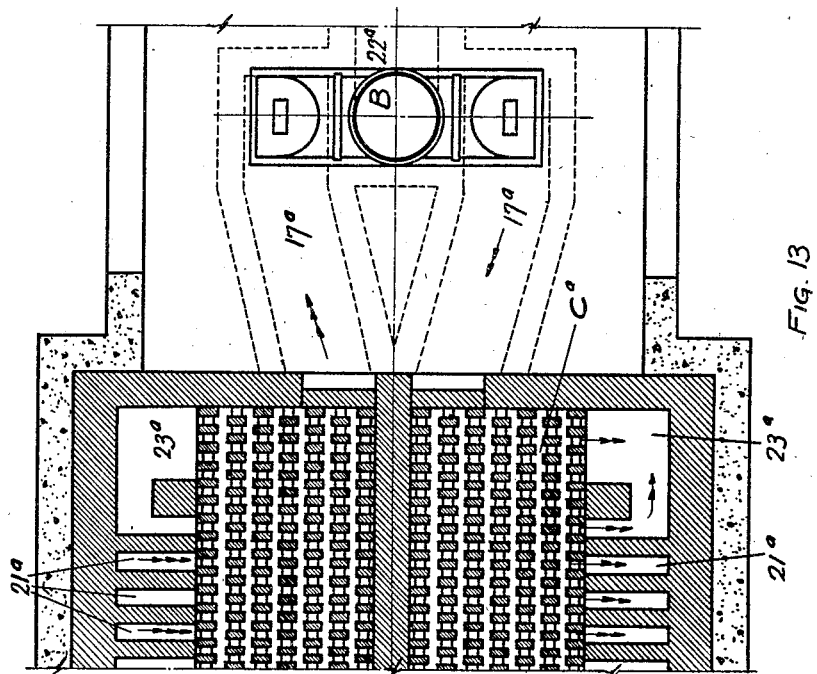
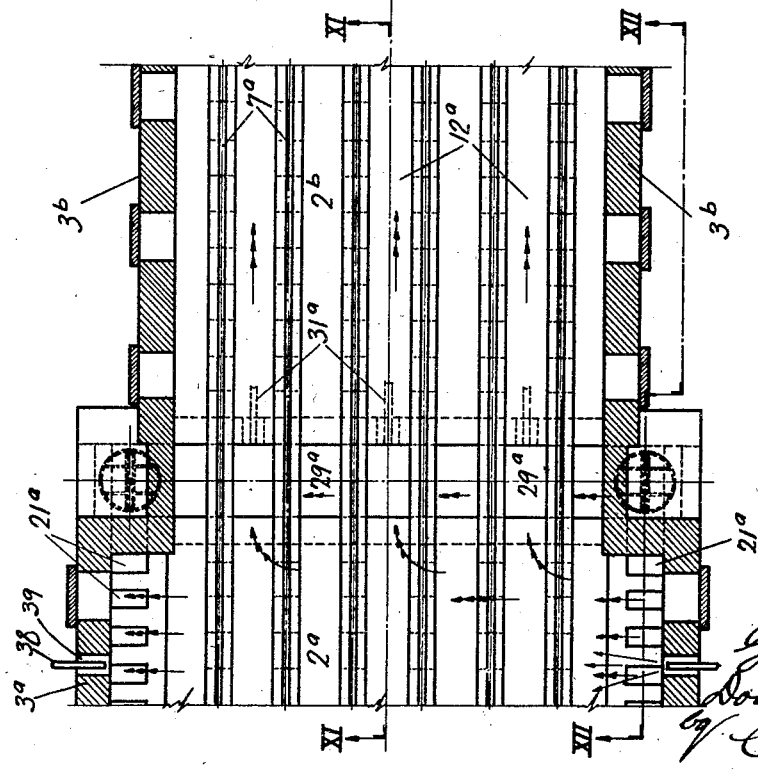
INVENTORS June 20, 1933.  G. NAISMITH ET AL  1,914,955
FURNACE
Filed Dec. 23, 1929  9 Sheets-Sheet 8

INVENTORS

June 20, 1933.    G. NAISMITH ET AL    1,914,955
FURNACE
Filed Dec. 23, 1929    9 Sheets-Sheet 9

— Gas
— Air
— Products of Combustion.

INVENTORS
George Naismith
Donald M. Naismith
by C. M. Clarke
Atty.

Patented June 20, 1933

1,914,955

UNITED STATES PATENT OFFICE

GEORGE NAISMITH AND DONALD M. NAISMITH, OF PITTSBURGH, PENNSYLVANIA, ASSIGNORS TO DONALD M. NAISMITH, OF PITTSBURGH, PENNSYLVANIA

FURNACE

Application filed December 23, 1929. Serial No. 416,222.

Our invention is an improvement in heating furnaces of combined regenerative and direct-fired type particularly adapted to the heating of billets and the like, as in a gravity-inclined furnace.

It has in view to provide a combination reversible and continuous direct-fired furnace whereby one portion may be operated as a regenerative furnace and another portion may be operated as a direct-fired furnace, without valve control, or whereby the entire furnace may be operated in its entirety as one reversible furnace.

Another object of the invention is to provide a furnace in which the reversible portion may be fired with one kind of fuel and a direct-fired portion may be fired with another kind of fuel, or both parts with same kind of fuel, and wherein pre-heated air from the reversible portion is used to promote combustion in the direct continuous portion with a reversible supply of pre-heated air from one side or the other for the direct-fired portion.

The invention also provides a furnace utilizing a combination of cross-firing and longitudinal firing, the latter being accomplished by splitting a portion of the flame from the cross-firing end. In the construction shown, utilizing water-cooled skid pipes, the flame heat is supplied to the space above as well as below the skid pipes, in combination with the regenerative fired end. In certain alternative constructions the direct-fired portion is separated from the regenerative fired portion by a transverse pre-heated air passage in the roof, or below the skid pipes, without interruption of the continuous heating chamber.

The regenerative portion of the furnace is so constructed that parallel gas and air flues are so arranged that gas for pre-heating is introduced into the flues in a longitudinal direction and then caused to flow at right angles to such travel.

The reversible portion of the furnace also involves air regeneration utilizing gas ports passing through air regenerators or forming a part thereof, whereby incoming gas is preheated by reason of the fact that the outer surfaces of the gas port construction are exposed to that in the air regenerators.

The construction has in view to provide in a furnace construction of such type, means for utilizing practically all of the waste heat for pre-heating of the incoming air in a direct, economical and effective manner; also to use the gases or other fuel of combustion most effectively and directly inwardly, upwardly and outwardly through, across, and within the heating chamber, and to provide a simple, economical, and easily built and repaired furnace construction of the type involved.

This application is substituted for our prior application filed July 2, 1928, Serial No. 289,756.

In the drawings showing certain preferred embodiments of the invention:

Fig. 4 is a longitudinal cross sectional view, partly in plan, on the broken section line IV—IV of Fig. 5;

Fig. 5 is a cross sectional view on the line V—V of Fig. 3, or on the broken line V—V of Fig. 1;

Fig. 6 is a similar view on the line VI—VI of Fig. 3;

Fig. 10 is a partial plan view, similar to Fig. 1, showing an arrangement for transverse air supply below the skid pipes;

Fig. 13 is a partial longitudinal horizontal section on the line XIII—XIII of Fig. 12;

Figure 1:
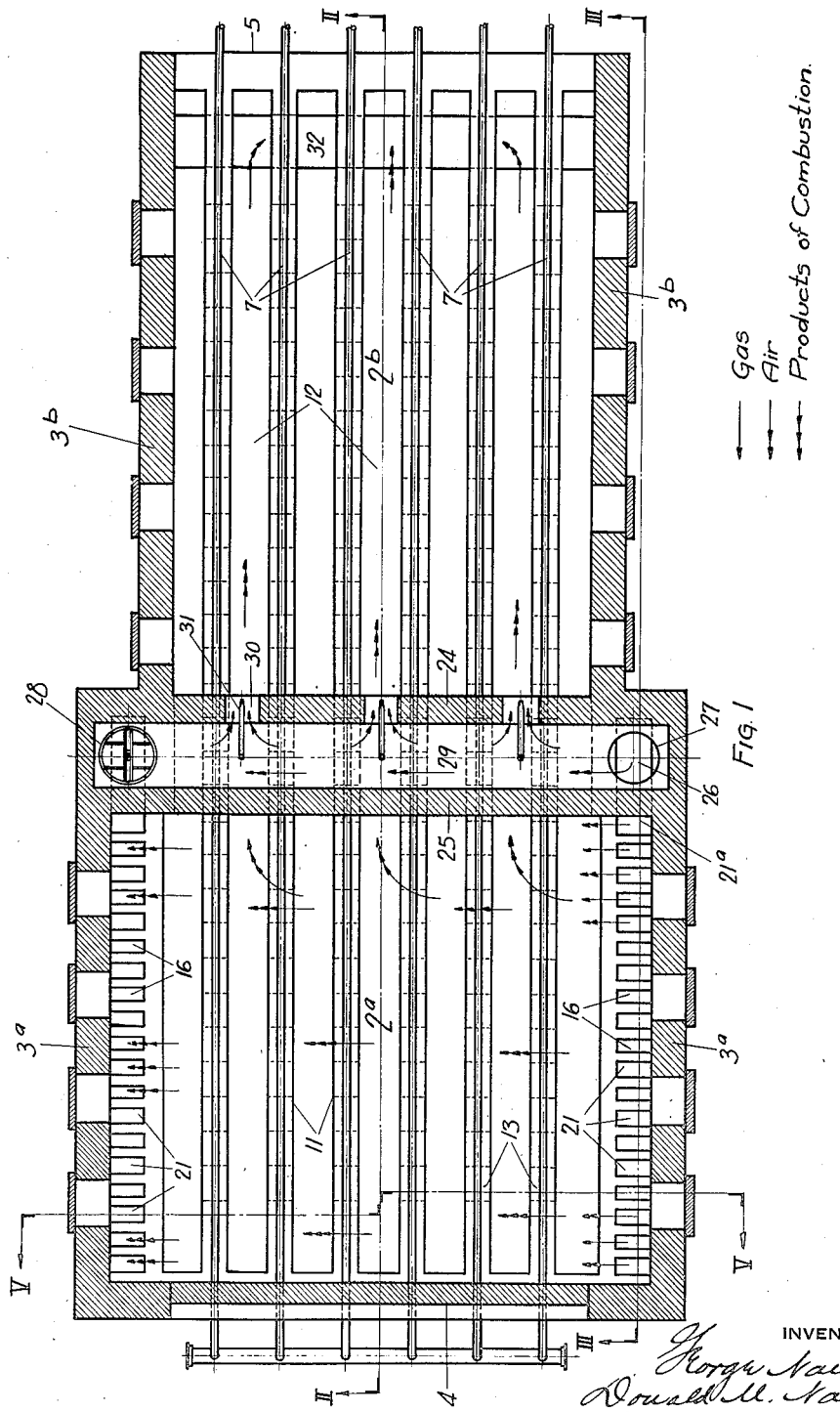
Fig. 1 is a horizontal sectional view of the furnace on the line I—I of Fig. 2.

The heating chamber of the furnace, comprising the secondary cross fired portion 2a and the primary longitudinally fired portion 2b, is of generally rectangular construction within side walls 3a—3b and outermost end walls 4—5, with the main covering roof 6.

The material to be heated, as billets or the like, is passed through the furnace from one end to the other progressively over longitudinal water-cooled skid pipes 7, from an entrance opening 8 in end wall 5, and discharged through an exit opening 9, by the gravity discharging terminals 10 of the skid pipes. These are of common, well known construction, slightly sloping from one end of the furnace to the other, and are preferably mounted upon longitudinal individual piers or ridges 11 alternating with longitudinal circulation spaces 12 and having lower transverse circulation ports 13, as shown. The billets are successively progressed through the furnace over the skid pipes by means of a pusher 14 of any suitable type.

The heating fuel, which may be gas or of other suitable fluid form, is utilized in connection with pre-heated air and with regeneration and utilization of waste heat in the art of regenerative furnaces, with the usual alternating reversal, as will be well understood.

A gas valve A and an air valve B, of the usual Siemens or other suitable type, are located in the charging end portion of the furnace, the gas valve being shown without the usual supply pipe, for clearness.

Each side of valve A communicates through supply and return flues 15, each of which extends throughout the under longitudinal portion of the furnace at each side, as in Fig. 4.

At each outer side of main supply and return flues 15 are a series of individual gas supply ports 16 extending upwardly through the side wall at each side and opening through the top of the wall to the interior, for supply of gas longitudinally at one side and the other, for cross combustion in the cross fired portion of the furnace 2a.

The air valve B in the same manner communicates at one side and the other with main air supply and return ports 17 which also extend underneath longitudinally throughout the regenerative and cross fired portion of the furnace, as shown. Port 17 is preferably divided, co-extensive with the regenerative zone, with a partition wall 18, providing the main air supply and return channel into individual channels 17b, mainly for purposes of expediency in providing a supporting construction for the superimposed checkerwork.

Figure 3:
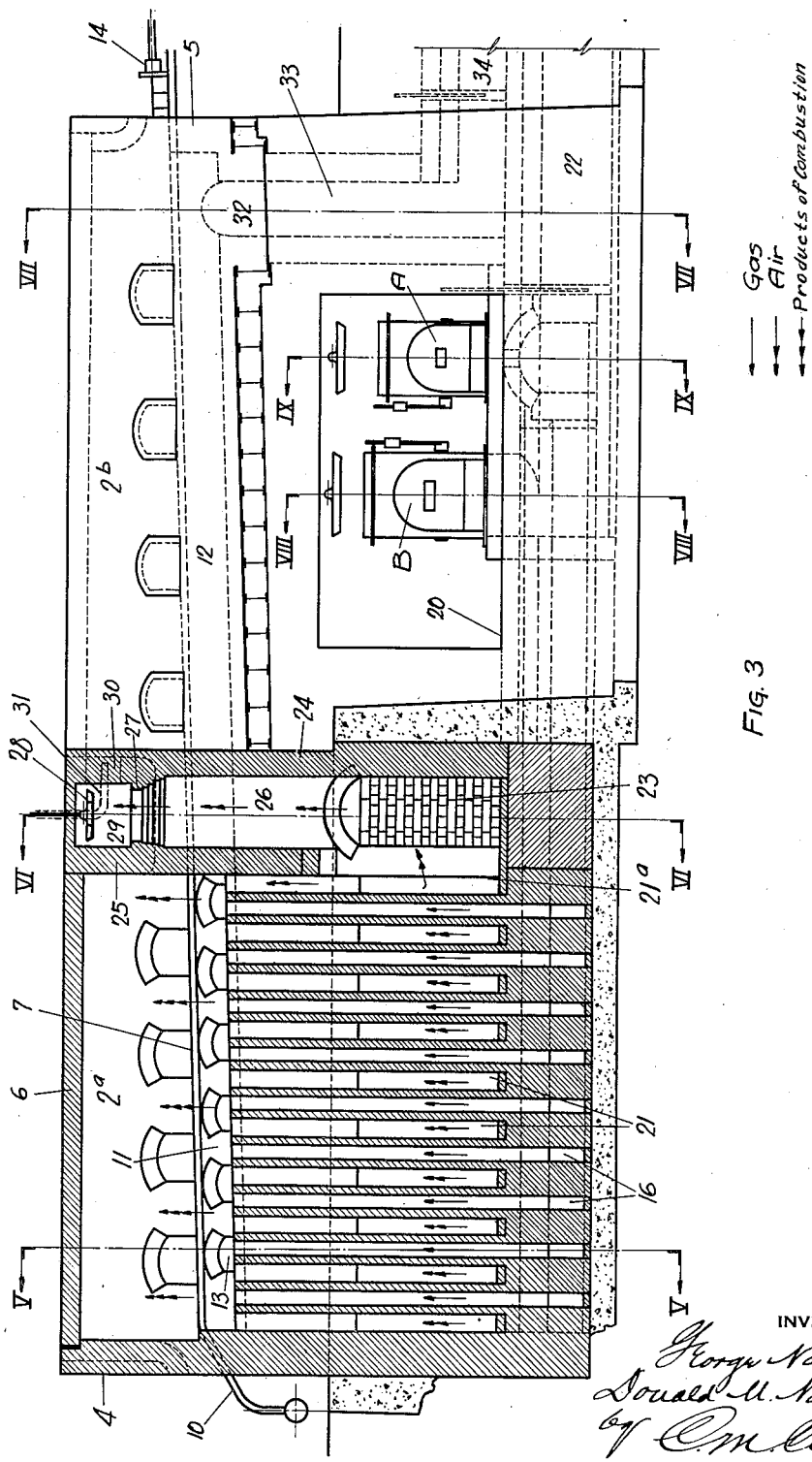
Fig. 3 is a similar view on the line III—III of Fig. 1, partly in side elevation at the charging end.
Figure 7:
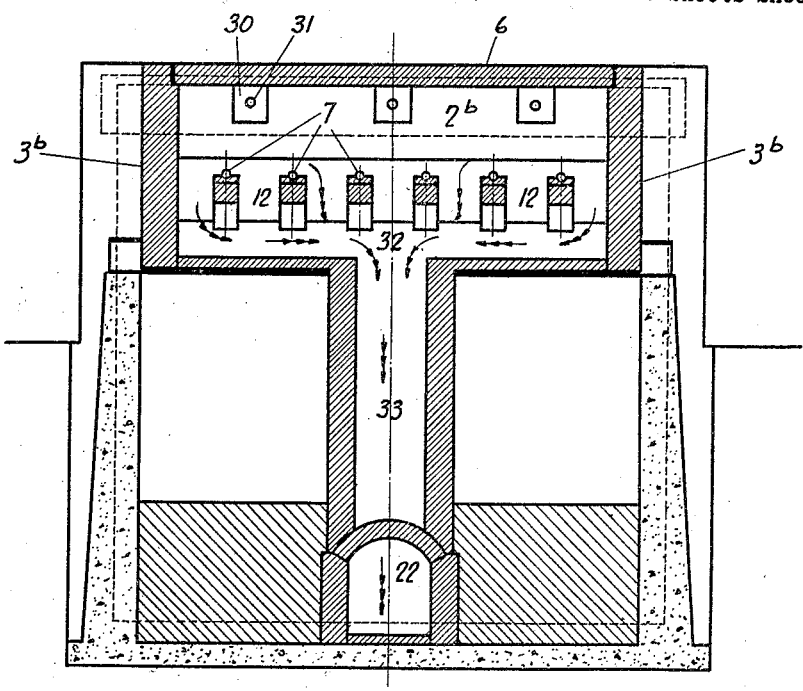
Fig. 7 is a similar view on the line VII—VII of Fig. 3.
Figure 8:
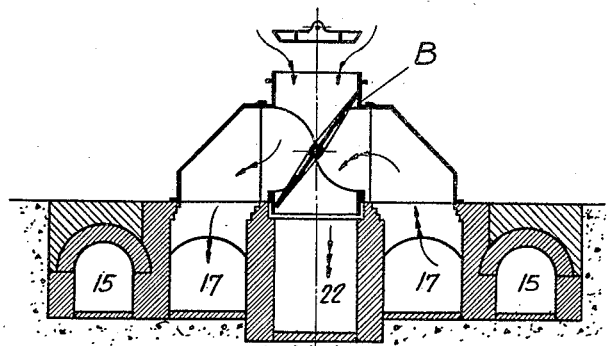
Fig. 8 is a similar view on the line VIII—VIII of Fig. 3, through the reversible air inlet valve.
Figure 9:
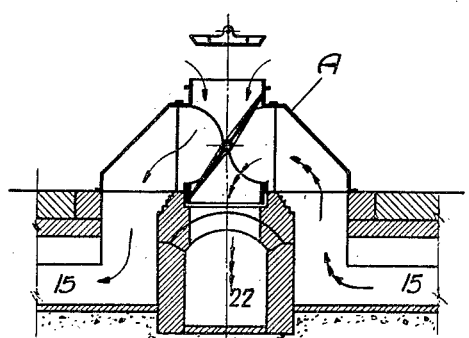
Fig. 9 is a similar view on the line IX—IX of Fig. 3, through the reversible gas inlet valve.
Figure 12:
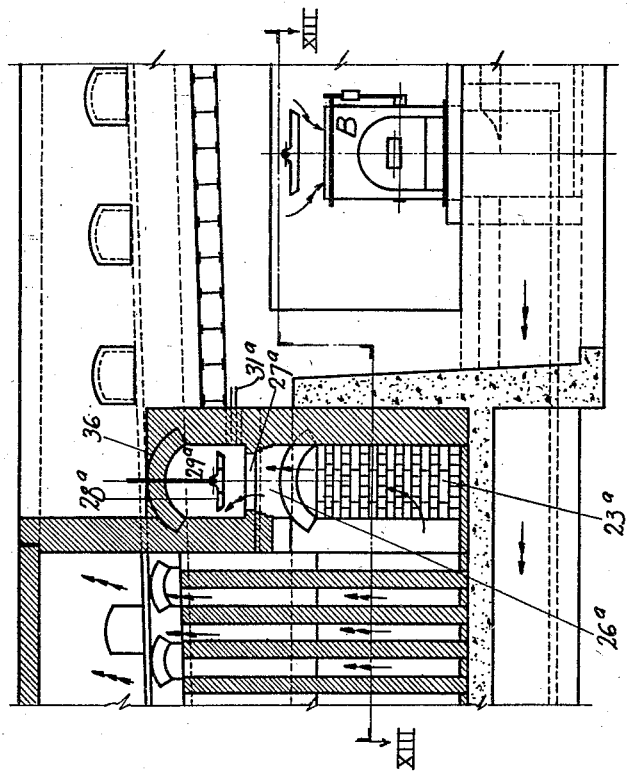
Fig. 12 is a similar section on the line XII—XII of Fig. 10.

The latter, which may be of any suitable construction in common use and well adapted for free circulation therethrough of the outgoing products of combustion, and of incoming cold air for heating, is generally represented at C and occupies the space above the main circulating ports and between the vertical circulating ports within the side walls, and below an upper covering roof or cover 19. The checkerwork extends upwardly from a general common plane 20, the outer portion of which forms the terminating bottom of a series of alternating ports 21. Such ports intervene between adjacent ports 16 and extend upwardly at each opposite side and terminate at the same general level with the gas ports 16, as in Figs. 3 and 5.

By such construction and arrangement, and with proper reversing operation of the gas and air valves, heated air is combined with pre-heated fuel and delivered at one side and the other of the cross-fired portion of the furnace, at suitable time intervals. At the same time products of combustion pass across the portion 2a of the furnace over and underneath the skid pipes and completely around the charge thereon, eventually passing downwardly by ports 21 and 16 at the other side and outwardly through channels 17b and flues 17 and 15 to the air valve B and gas valve A, and thence through main flue opening 22 to the stack.

For the purpose of supplying pre-heated air to promote combustion in direct or longitudinally-fired chamber 2b of the furnace, we utilize a portion of pre-heated air, obtained from the inner terminal port 21a and from chambers 23. The latter chambers are located at opposite sides, built in beyond the front wall 24, which extends transversely from side to side of the furnace clear to its top. As shown, chamber 23 communicates directly with port 21a and with checkers in air regenerators.

Figure 2:
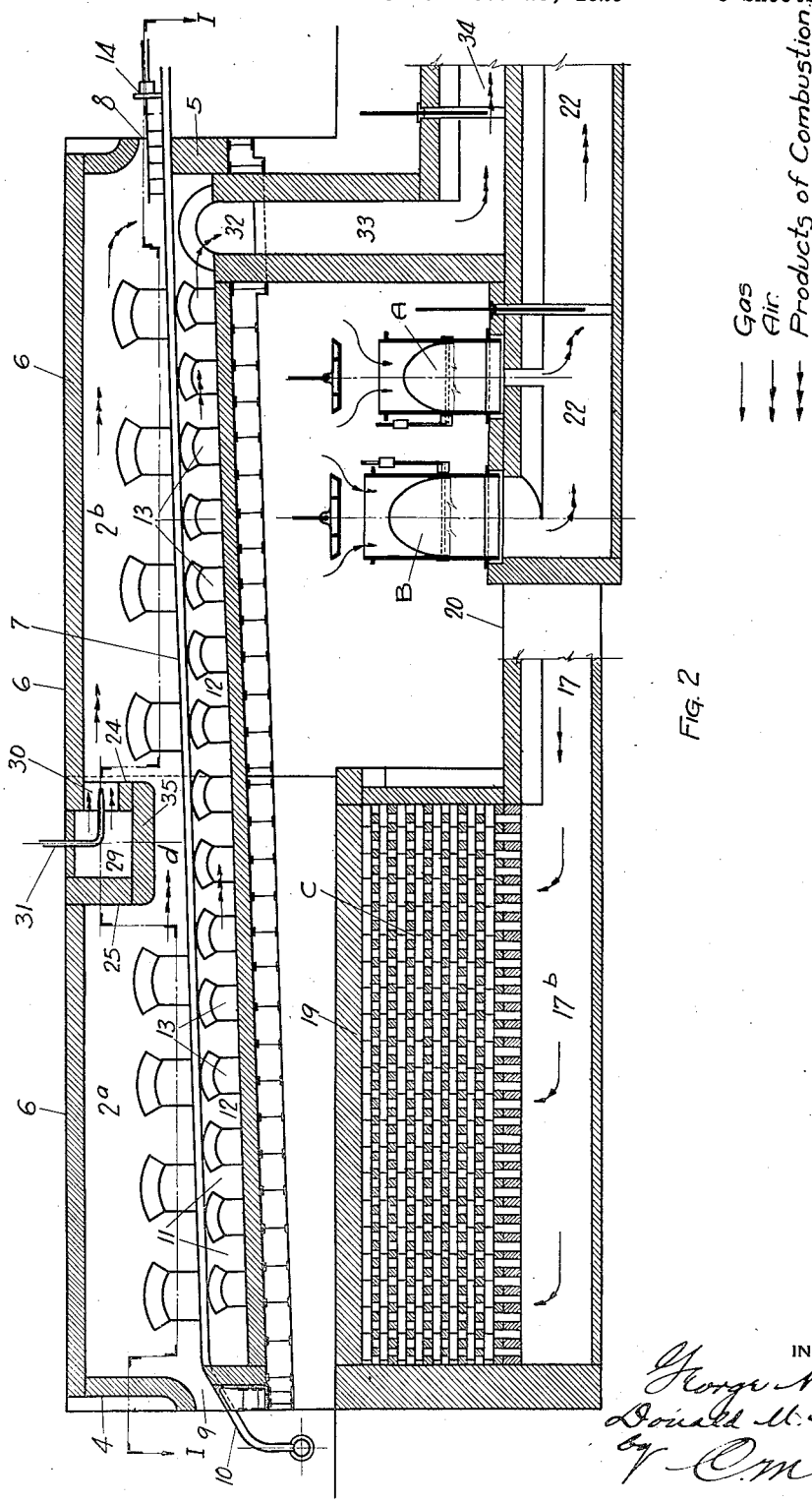
Fig. 2 is a longitudinal vertical section on the line II—II of Fig. 1.

At each opposite side of the furnace, and above chamber 23, are upwardly extending flues 26 communicating through valve-closed ports 27, opened and closed by suitably operated valves 28, with a common transverse air circulating chamber 29. The latter extends across for the width of the furnace, between the upper wall extensions 24—25 noted, and is provided with a series of forwardly extending openings 30, as in Fig. 2.

A corresponding series of fuel supply pipes 31, for gas, oil, or other suitable fluid, extend downwardly through the top of chamber 29, and forwardly through the air openings 30, for supply of fuel therewith longitudinally through the chamber 2b, between such substantially middle portion of the furnace and its charging end. A transverse channel 32 extending across between the side walls, underneath the skid pipes, and communicating with channels 12 and with the upper main portion of the heating chamber, collects and supplies products of combustion through a middle downwardly extending flue 33 and an upper longitudinal flue 34, to the stack or other suitable outlet. Each of such stack supplies is furnished with a damper control of suitable construction, as indicated in the drawings.

The upper transverse portions of the main walls 24 and 25 are bridged across the upper middle portion of the heating chamber as shown, and are closed by a bottom wall 35, providing a common transverse opening d above the skid pipes, with ample clearance for the billets or other charge, and for forward circulation of a portion of the cross-fired products of combustion in chamber 2a. Such partial extraction of the main gases in chamber 2a is effected by thus splitting the flame, so that a portion passes above and below the billets on the skid pipes and a large portion will pass underneath the upper air and fuel supply flue 29 into the charging heating chamber 2b, and with extraction of the heat of the products of combustion thereof, as described.

With the main fuel combustion as explained in chamber 2a, and with regeneration by the products of combustion therefrom, the maximum heat is produced in such chamber, with utilization of the waste gases for regeneration. The partial extraction of the heat therefrom in the front or charging chamber 2b, together with the limited or controlled supply of additional fuel, provides desirable preliminary heating temperature therein for first action on the cold billets, etc. By such sub-division of the two main heat supplies, the billets are gradually and economically heated in the manner best adapted to extract the full value from the heating gases, and are delivered at the discharge end of the furnace in a properly heated condition.

In Figs. 10 to 15 inclusive we show certain alternative constructions utilizing an under supply of supplementing fuel for the charging or preliminary heating chamber 2b. The construction of the furnace as a whole is generally the same as above described, but with the heating chambers 2a—2b continuous and merely off-set or widened at the middle to the extent of the greater width of the cross-firing zone, requiring the additional port space at each side.

Figure 11:
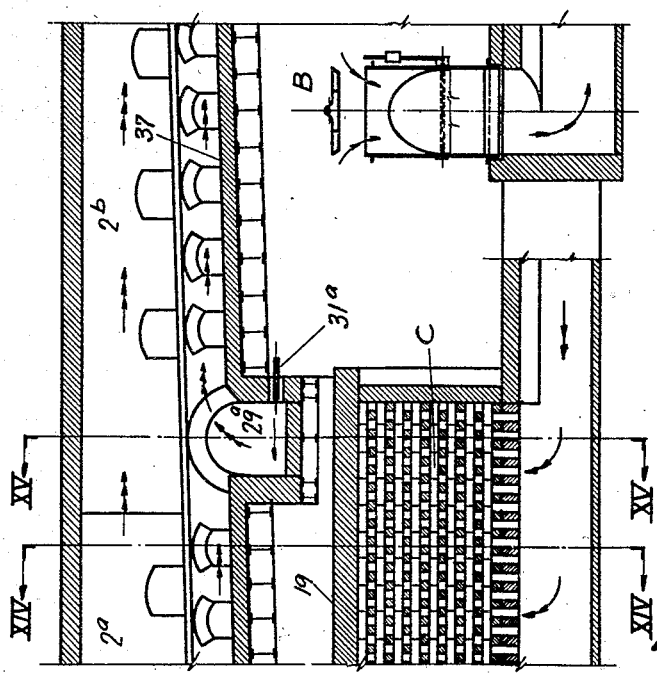
Fig. 11 is a partial longitudinal vertical section, similar to Fig. 2, but showing such air supply, on the line XI—XI of Fig. 10.

In such construction, under firing for supply to the charging zone or chamber 2b is effected by arranging the transverse hot air supply conduit 29a below the floor surface 37 supporting the skid pipe piers and opening upwardly between them, as in Figs. 10 and 11.

The transverse conduit 29a receives supplementing fuel from pipes 31a and delivers the combined hot air and such fuel, either gas or oil, upwardly and forwardly along underneath the skid pipes and billets between their piers, finally emerging with the main products of combustion through the transverse and vertical flues 32—33, already described.

Transverse passage 29a communicates at each end, i. e., each side of the heating chamber, through valve-controlled ports 27a, opened and closed by valves 28a with the oppositely located channels 26a leading to and from the checkerwork C.

Figure 15:
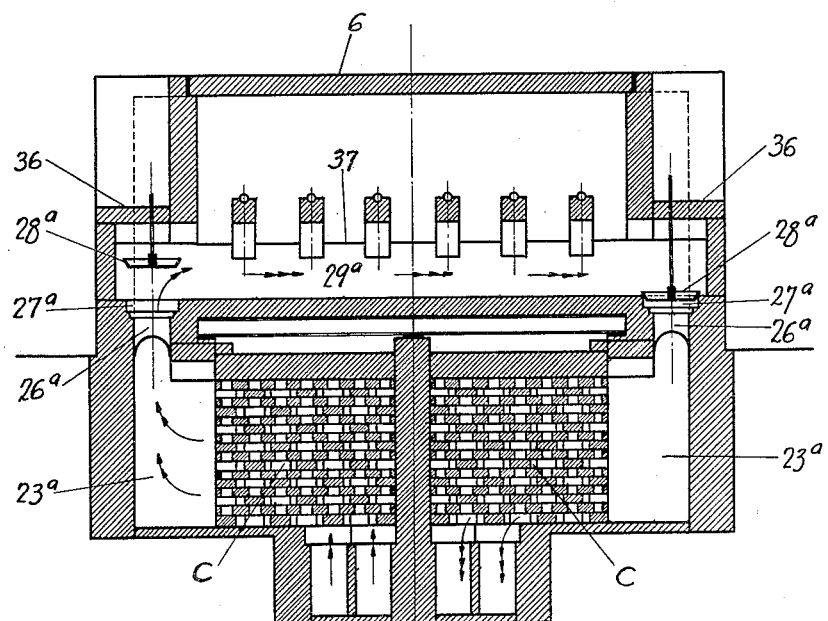
Fig. 15 is a cross section on the line XV—XV of Fig. 11, similar to Fig. 6, but showing the arrangement of controlling valves at opposite sides for the hot air supply, transversely below the skid pipes.

In such construction the end portions of the transverse conduit 29a are roofed over, as at 36, providing for clearance above for the valve stems and their operating levers, etc., as in Fig. 15.

Figure 14:
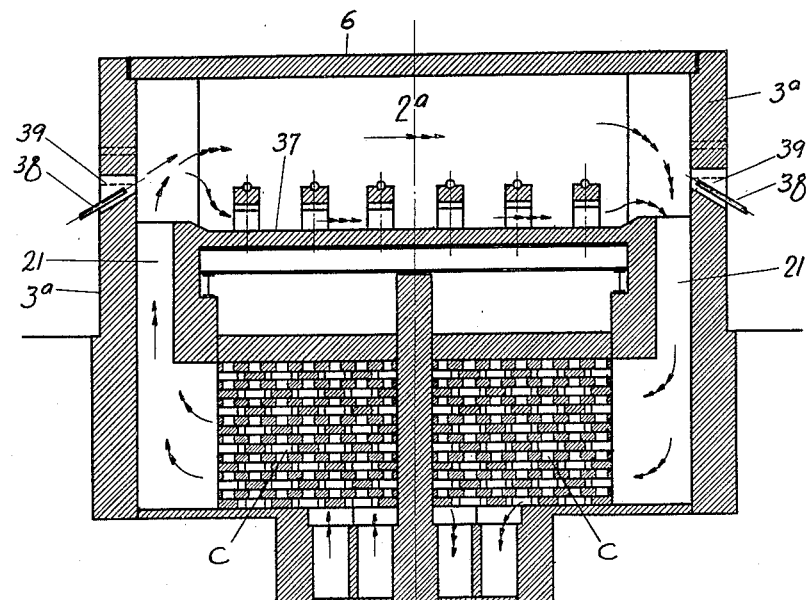
Fig. 14 is a cross section on the line XIV—XIV of Fig. 11, but showing the application of supplemental fuel supply at opposite sides of the reversible heating portion of the furnace.

Fig. 14 illustrates a construction generally similar to that of the main cross-firing chamber already described, with the addition of supplemental or entire fuel supply by oil or gas pipes 38 at each side. These are located at intervals, extending through openings 39 in the side walls 3a for admixture and supply of such additional or main supply fuel with the preheated air from the regenerative chambers, supplied alternately by the upwardly directed currents of pre-heated air delivered through ports 21.

The entire heating chamber, as to both compartments, is enclosed between its main floor or bottom portion 37 and the covering roof or top 6, of any suitable or appropriate construction, either of the flat or sprung arch form, as preferred.

When used for the main supply of fuel, either gas or oil by pipes 38, the usual gas controlling valve A, as well as all gas flues and ports, may be omitted, utilizing the air control valve B only, as in Fig. 13.

The general construction, manner of operation, functions and results of the invention will be readily understood and appreciated from the foregoing description. The furnace as a whole is simple, direct and economical in its construction and operation; it operates by natural draft without the interposition of any supplemental or artificial current-inducing mechanism; it avoids to a large extent the employment of various supplemental mechanical details of construction and operation, and is capable of continuous and effective use, with adequate and accurate control at all times.

Whether used with or without the supplemental fuel supply, the furnace provides a construction for gradually and completely heating its contents, without waste of heat, and with full utilization of the highest percentage of heat units of the fuel, in a satisfactory, regular and efficient manner.

The supply of air and fuel are under the control of the operator by suitable valve or gate mechanism, and the furnace may be operated continuously, with the usual reversal of circulation through the regenerative portion, for cross-firing in the secondary chamber 2a, and with resulting regularity of operation.

The desired temperature may be continuously maintained in both chambers and throughout the furnace entirely to the desired degree, and the articles to be heated may be exposed to the circulating gases within the entire chamber cavity or cavities for any desired time, depending on the rate of movement of the billets or other articles to be heated therethrough.

The furnace, its heating chamber or chambers, circulating ports and channels, and various other portions may be of any desired proportions, size or suitable design, to adapt the construction to its intended use with regard to the size and character of the metal to be heated, and may be otherwise variously changed in detail construction by the skilled mechanic or builder, but all such changes are to be understood as within the scope of the accompanying claims.

What we claim is:—

1. A heating furnace of the class described having a charging end and a discharging end and longitudinal spaced-apart supporting piers provided with transverse openings, means providing fuel supply for combustion and circulation of heating gases across the discharging end and longitudinally between the piers, and a transverse fuel conduit between the ends discharging downwardly toward the hearth of the furnace.

2. A heating furnace of the class described having continuous longitudinal spaced-apart supporting piers provided with transverse openings through their bases, means providing fuel supply for combustion and circulation of heating gases transversely through the base openings of the piers, and means supplementing such fuel supply above the piers consisting of a transverse fuel conduit.

3. In a furnace provided with a continuous heating chamber, and a charging opening at one end and a discharging opening at the other, means for introducing fuel across the discharging end for partial circulation towards the charging end, and a transverse fuel conduit between the ends and above the hearth adapted to furnish additional fuel downwardly to the main circulation.

4. In a furnace provided with a continuous heating chamber, and a charging opening at one end and a discharging opening at the other, means for alternately introducing fuel across the discharging end for partial circulation towards the charging end, and a transverse fuel conduit between the ends for supply towards the charging end of the furnace and adapted to furnish additional fuel to the main circulation.

5. In combination with a furnace provided with a longitudinal series of supporting piers between endmost charging and discharging openings and means for supplying alternating currents of fuel in combustion across the width of the furnace at the discharging end, a transverse fuel supply chamber located across the furnace between its ends having an enclosing wall extending downwardly towards the piers.

6. In a heating furnace as described provided with regenerative chambers and air and fuel ports opening into opposite side portions of the furnace, a supplemental air and fuel supply chamber extending across the furnace between its ends and having communicating connection with the regenerative chambers at each side of the furnace.

7. A heating furnace of the class described having longitudinal spaced-apart supporting piers providing continuous skid pipe bearings at their upper portions and provided at their bases with series of transverse openings, supporting skid pipes laid thereon, means providing fuel supply for combustion and circulation of heating gases longitudinally between and transversely through the transverse openings of the piers, and a transverse fuel conduit between the ends of the furnace discharging downwardy toward the hearth.

8. A heating furnace having outer walls enclosing a continuous heating chamber, one portion thereof being provided with a regenerative heat supply alternately furnished across the delivery end of the furnace and provided intermediate of its ends with a transverse direct-fired heat supply fuel conduit discharging downwardly towards the hearth in the direction of the receiving end of the furnace.

9. A furnace provided with an upper heating chamber and a lower regenerative chamber having gas circulation ports passing upwardly through inwardly extending portions of the outer walls of the regenerative chamber, said portions providing between them alternating air circulation ports having outer portions substantially in alinement with the gas ports.

10. A furnace provided with an upper heating chamber and a lower regenerative chamber having longitudinal gas and air flues extending underneath the regenerative chamber and then upwardly through and between inwardly extending portions of the outer walls of the regenerative chamber, the outer portions of the gas and air passages being in substantially longitudinal alinement.

11. A furnace provided with an upper heating chamber and a lower regenerative chamber having longitudinal air flues extending underneath the regenerative chamber for circulation upwardly and laterally therethrough and similarly arranged gas flues for circulation laterally and upwardly through inwardly extending spaced apart portions of the outer walls of the regenerative chamber providing alternating gas circulation ports communicating with the gas flues, the outer portions of the upwardly circulating air and gas passages being in substantially longitudinal alinement.

12. Furnace construction as in claim 9 characterized by the upper termination of the alternating gas and air circulation ports on a common level.

In testimony whereof we hereunto affix our signatures.

GEORGE NAISMITH.
DONALD M. NAISMITH.